June 27, 1933.  W. LÖBBE  1,915,501
ROPE FLANKING SHEAVE
Filed Dec. 5, 1930
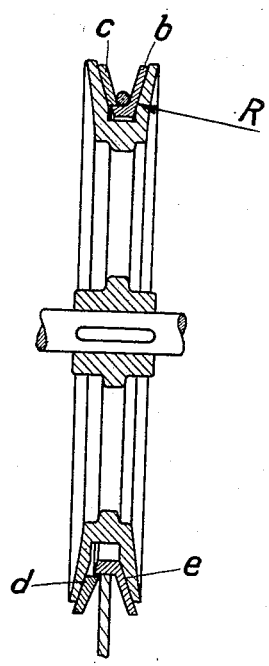
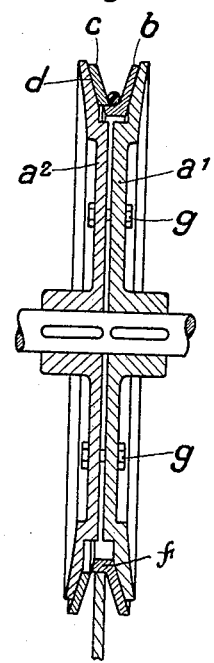

Patented June 27, 1933

1,915,501

UNITED STATES PATENT OFFICE

WILHELM LÖBBE, OF OBERADEN, GERMANY, ASSIGNOR TO GEWERKSCHAFT EISEN-HUTTE WESTFALIA OF LUNEN-ON-THE-LIPPE, GERMANY, A GERMAN COMPANY

ROPE FLANKING SHEAVE

Application filed December 5, 1930, Serial No. 500,367, and in Germany December 16, 1929.

The invention relates to a rope clamp flanking sheave with several rope flank clamping rings displaceable transversely in relation to each other and mounted pivotally opposite the rope sheave.

In a known constructional form of a rope flank clamping sheave, there is provided, in the wedge shaped depression of the crown of the sheave, in addition to the two rope flank clamping rings, a third bottom ring entirely independent of the other two. The mutual arrangement of the three rings is such that the pressure exerted upon the bottom ring under the action of the load is transmitted by this ring to the lateral clamping ring at the point of contact with the side lying diametrically opposite to the rope. The pressure upon the side rings is again retransmitted to the side line diametrically opposite and in this way the transverse displacement of the lateral clamping rings is produced at this point.

This construction and arrangement of the parts, particularly when taking up heavy loads, have the disadvantage that the bottom ring is pressed into an oval shape and there is great danger of its breakage.

Furthermore there is the disadvantage of the high degree of wear and tear of the sides of the bottom ring and of the two side rings owing to the high specific pressure supervening in the lower part of the bottom ring between it and the side rings. Owing to the great wear and tear, consequently, the power transmission of the bottom ring to the side rings will soon deteriorate and cause interruptions or breakdowns.

According to the invention in which these disadvantages are obviated, the bottom ring consists of one piece together with the two side rings. The load is therefore taken up directly at the point of contact of the rope with the bottom ring both by said ring and at the same time by the side ring. Consequently any oval deformation by pressure of the bottom ring cannot take place.

The side ring not forming one piece together with the bottom ring is preferably so made that it can be displaced transversely upon the bottom ring substantially parallel to the axis of the rope sheave.

At the points contacting with the rope the clamping rings are preferably so made that they will adapt themselves to the form of the rope, whereby a uniform pressing of the rope is secured and an alteration of the cross-sectional form thereof is avoided.

In the accompanying drawing, examples of constructional forms of the device according to the invention are given.

Figure 1 is a vertical section of one form of rope flank clamping disc and clamping rings according to the invention, and Figure 2 is a further constructional form, also in vertical section of the rope flank clamping sheave, in which the rope sheave proper consists of two discs symmetrical above the central plane perpendicular to the axis.

$a$ is the rope sheave proper in the crown of which with ball or cone surfaces $d$, $e$ there are arranged the rope flank clamping rings $c$, $b$ displaceable transversely in relation to each other and rotatable opposite the rope sheave. One of the two rope flank or side clamping rings, for example $b$, is firmly connected to or formed integrally with a bottom or inner central ring $f$ substantially parallel to the axis of the sheave. The rope flank clamping ring $c$, not connected with the bottom ring, is mounted displaceably upon the clamping ring $f$. Under the action of the load the clamping ring $b$ is pressed downwardly as shown in the drawing, together with the ring $f$ and at the same time displaces itself owing to the bearing against the wedge or ball shaped surface $e$, in the direction of the sheave axis against the clamping ring $c$. At the same time the bottom ring $f$ presses at its lower part upon the side clamping ring $c$ and thus causes its displacement at the point lying diametrically opposite against the lateral clamping ring $b$ upon the bottom ring $f$.

In order to render the insertion of the clamping rings possible into the groove of the crown of the rope sheave each clamping ring consists of at least two parts.

The construction according to Figure 2 differs from that already described merely in that the rope sheave proper consists of two sheave portions $a^1$, $a^2$ fastened to each other by means of screws $g$. In this case each clamping ring may, if desired, be made in one single piece but preferably it comprises two or more parts because this construction gives the further advantage that the clamping rings can be removed without having to withdraw the rope sheave from the shaft. The arrangement, formation and method of operation of the remaining parts correspond to the constructional type already described.

What I claim and desire to secure by Letters Patent of the United States is:—

1. A pulley provided with a peripheral groove having its side faces outwardly inclined, side clamping rings in said groove bearing against said faces, and an inner central ring formed integrally with one of said side rings, the inner diameters of the rings being greater than the diameter of the base of said groove.

2. A pulley provided with a peripheral groove having its side faces outwardly inclined, side clamping rings in said groove bearing against said faces, and an inner central ring formed integrally with one of said side rings, the inner diameters of the rings being greater than the diameter of the base of said groove, and the other of said side rings being mounted on said central ring and axially displaceable thereon.

3. A pulley provided with a peripheral groove having its side faces outwardly inclined, side clamping rings of sectional formation in said groove bearing against said faces, and an inner central sectional ring formed integrally with one of said side rings, the inner diameters of the rings being greater than the diameter of the base of said groove.

WILHELM LÖBBE.